Figure 1:
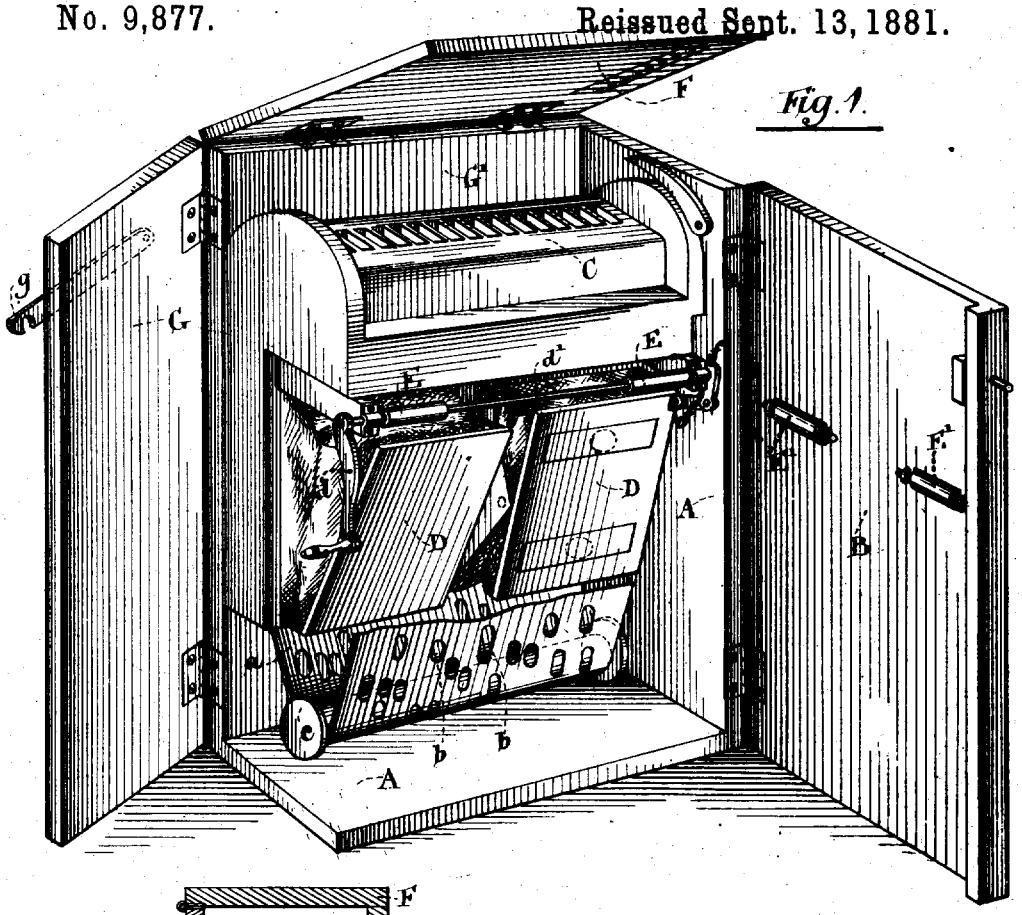

E. P. NEEDHAM,

Assignor, by mesne assignments, to M. J. MATTHEWS, J. NICHOL, and J. MORGAN, (J. MATTHEWS, executrix, and J. MORGAN, executor, of M. J. MATTHEWS, dec'd.)

MECHANICAL MUSICAL INSTRUMENT.

No. 9,877. Reissued Sept. 13, 1881.

Witnesses:-
Louis M. T. Whitehead
Fred K. Hoyne

Inventor:-
Elias P. Needham
by his Attorneys
Brown & Brown

UNITED STATES PATENT OFFICE.

ELIAS P. NEEDHAM, OF NEW YORK, ASSIGNOR, BY MESNE ASSIGNMENTS, TO MASON J. MATTHEWS AND JOHN NICHOL, OF NEW YORK CITY, AND JAMES MORGAN, OF BROOKLYN, N. Y., (JANE MATTHEWS, OF NEW YORK, EXECUTRIX, AND JAMES MORGAN, OF BROOKLYN, N. Y., EXECUTOR, OF MASON J. MATTHEWS, DECEASED.)

MECHANICAL MUSICAL INSTRUMENT.

SPECIFICATION forming part of Reissued Letters Patent No. 9,877, dated September 18, 1881.

Original No. 197,048, dated November 13, 1877; Reissue No. 8,451, dated October 15, 1878; Reissue No. 8,976, dated November 18, 1879.
Application for reissue filed August 4, 1880.

*To all whom it may concern:*

Be it known that I, ELIAS P. NEEDHAM, of the city, county, and State of New York, have invented certain new and useful Improvements in Mechanical Musical Instruments; and I do hereby declare that the following is a full and exact description of the same, reference being had to the accompanying drawings, and to the letters of reference marked thereon.

This invention has reference to improvements in automatic wind-instruments in which perforated paper or other material is automatically passed over the ends of air passages or ducts, and, acting as a valve, controls the admission of air so as to produce the desired combination, succession, and duration of sounds.

It consists in a combination of parts including air ducts or passages, and an apron, strip, sheet, or endless belt of any suitable material, having perforations corresponding to the location of air-ducts leading to sound-producing devices to be operated in succession or simultaneously, and the duration of the notes, whereby said apron, strip, sheet, or endless belt serves as a valve, admitting air to and excluding it from the air-ducts.

It further consists in a combination of parts including a perforated apron, strip, sheet, or endless belt, whereby the latter is caused to be held to its seat by air-pressure, and leakage is effectually avoided.

It further consists in a novel combination of parts whereby a feed-roller serving to impart motion to the perforated apron, strip, sheet, or endless belt serves also to operate the bellows, and may also constitute the driving-shaft of the instrument.

It further consists in the novel combination of parts by which the perforated apron, strip, sheet, or belt is moved, guided, and retained, and the bellows operated to produce the desired combination of sounds.

It further consists in the combination of a reed-chamber containing reeds, and constructed with ducts or passages leading to the reeds and open at their outer ends to the external atmosphere, a music-sheet for controlling the operation of said reeds, a rest for said music-sheet at the outer ends of said ducts, and a resonant cover arranged directly over said rest and capable of being adjusted to different positions independently of the top or cover of the case of the instrument for regulating the force of the musical tones.

It also consists in the peculiar arrangement of the resonant sounding board or cover, by which one endless belt or sheet can be readily substituted for another, and the force and quality of the sound modified, as will be fully set forth.

Figure 2:
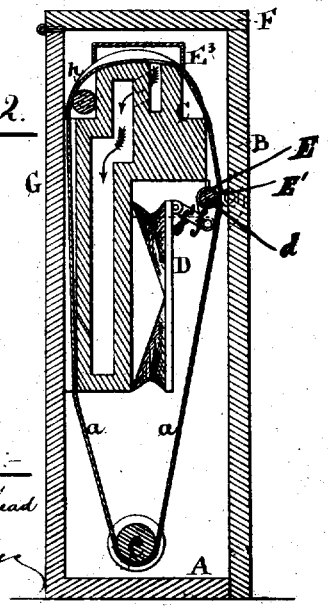
Figure 3:
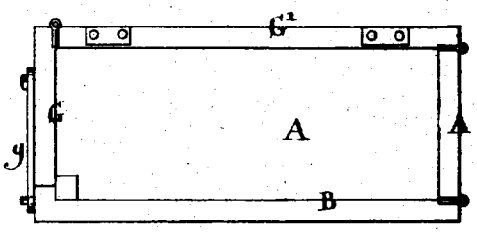

In the accompanying drawings, Figure 1 represents a perspective view of a musical instrument embodying my invention, the case being open and part of the apron, strip, sheet, or endless belt of perforated material removed, the better to exhibit the invention. Fig. 2 is a transverse vertical section of said instrument; and Fig. 3, a top view of the case of said instrument, with its top removed, illustrating the manner of hinging component parts of the case together.

In the drawings, A designates the stationary portions of the case.

B is the hinged side, to which the pressure-rollers are secured. These rollers, instead of being secured to the case, may be secured to a separate hinged strip.

C represents the reed-chamber, provided with air ducts or passages leading to the sound-producing devices or reeds, open, as here shown, to the atmosphere external to them, and terminating at the outer end in what I term a "rest."

D designate the bellows; $E^3$, resonant cover, placed over the reeds to concentrate and modify their tone, and which may be arranged so as to be partially or wholly withdrawn and replaced at will, to produce various musical effects of either a complete or partial swell or crescendo, or the reverse of either. It is shown in Fig. 2, but not in Fig. 1, as it would cover the reeds.

F is the top cover, hinged to the sides and provided with a stop, so that the same may be partially or entirely opened, and thus the force of the sound regulated or controlled.

G is the hinged end, secured to the hinged side G′.

The whole case is shown in Fig. 1 as hinged to the fixed vertical end and bottom A, so that the same may be readily opened and one endless sheet or belt substituted for another; but the case may be made without the hinged sides, and the whole instrument supported on a slide and upright similar to A A, so that the whole instrument may be withdrawn and the apron, strip, sheet, or endless belt secured, or one substituted for another.

It will be seen that the outer ends of the air ducts or passages and the entire surface of the rest in which they terminate are exposed to air-pressure, and are inclosed in the case or chest aforesaid, whence air may enter said ducts or passages.

The bellows D D act at all times, when the instrument is in operation, on all the reeds; but the air is excluded by the apron, strip, sheet, or the endless belt *a*, which acts as a valve on all the reeds. As, however, openings are cut into the sheet to correspond with the succession or simultaneous notes or sounds and their duration, the corresponding reed will be sounded when and as long as the opening is over the reed, so that air can be admitted to the reed and the tongue vibrated.

*b b* are the holes or openings in the apron, sheet, band, or belt, and their location with reference to the reeds represents the note in the reed, while their length represents the duration of the note.

*c* is a tension or guide roll suspended within the endless band or sheet *a*, so as to keep the sheet straight and even.

When a sheet of music of the ordinary length is to be used, the height of the instrument is such that the roller *c* can be suspended in the sheet. When, however, a sheet of music of more than ordinary length is to be used, two or more of the suspended rollers may be used by inserting one or more stationary rolls, revolving on their axes, and passing the sheet under a suspended roll, then upward over a fixed roll, and again under a suspended roll, from which it passes upward to and over or between the air-ducts or reeds, so that in a properly-arranged case music of any length can be inserted and automatically played.

*d* is a crank, secured to the end of the shaft *d′*, by which the same is turned.

E E are driving-pulleys, secured to the shaft *d′*. They may be formed by slipping a sleeve or sleeves of india-rubber or other elastic yielding material over the shaft *d′*, and they and said shaft may be regarded as one feed-roller.

E′ E′ are pressure-rolls, arranged to press against the pulleys E E and rotate with the same, and so propel the sheet of music between them evenly and uniformly. The rollers E′ E′ may also be made of elastic and yielding material, or they may be mounted in elastic or yielding bearings, so that when the sheet or band of the perforated music is inserted the pulleys E E and rolls E′ E′ will hold the sheet firmly, and on turning the crank *d* the sheet or band will not slip on the pulleys E E.

*f* is the crank by which the bellows are operated through a pitman, connecting-rod, or link, *f′*. There may be one or more cranks to operate the bellows; or they may be operated by other means from the shaft *d′*.

*g* is a clamp, by means of which the hinged piece B, carrying the rolls E′ E′, is held so that the rolls rest firmly against the pulleys E E.

*h* is a guide-roll, inserted to keep the endless sheet off the sides of the instrument. Such guide-rolls may be arranged in other places to insure the free working of the sheet *a*.

It is obvious that I thus enable a feed-roller to impart motion to the apron, strip, sheet, or belt *a*, and also to operate the bellows, and that when employed as shown this feed-roller also constitutes the driving-shaft of the instrument.

The instrument is operated as follows: An endless sheet, *a*, perforated to correspond with the notes of the music desired, is placed over the air ducts or passages leading to the reed-chest C, and the roller *c*, provided with the projecting rims or guides, is inserted so as to keep the sheet straight and even. The case is now closed, and the rollers E′ E′ press the sheet against the pulleys E E. The crank is turned, operating the bellows, and also moving the endless perforated sheet or belt over the reeds, admitting air at the proper time to the proper reeds, so as to cause a succession of sounds or chords of varying duration, and thus produce the desired tune or harmony in the measure of time, regulated by the revolution of the crank. The perforated sheet or belt forms a valve, whereby air is admitted to or excluded from the air ducts or passages leading to the reeds, and it is so combined with the bellows that it is held down to its seat by air-pressure, leakage between it and its seat being thus effectually avoided, and in a simple manner. When the perforated strip, sheet, or belt passes over a rest at the ends of the air ducts or passages, as shown, instead of between a rest and adjacent device provided with communicating ducts, passages, or chambers, it is less liable to be torn or misdirected, so that its perforations will not register with the ends of the air ducts or passages.

It is desirable, in instruments of this description, to repeat the music or tune several times, and sometimes without any intermission. With the single sheet wound on rolls this was not easily done; but with the endless sheet of perforated music the tune can be repeated with any desired interval between the tune, or successively without interval of time.

It is also desirable to modify the sound and adapt it to the room, the voice, or the expression of the music desired. This can be readily secured by the resonant cover $E^3$, which, with simple mechanism, can be raised or lowered independently of the top or cover of the case to produce the desired effect, and also by the hinged cover F, which can be secured in any desired position.

By the peculiar construction of the case and the driving mechanism one belt or endless sheet of perforated music can be quickly substituted for another without particular skill or judgment.

All the parts are simple, and not likely to get out of order.

The endless sheet of perforated paper, prepared cloth, or other suitable material arranged to form a valve to exclude the air from all the notes or reeds, except those to be sounded, can be cheaply prepared and furnished with the instrument, or sold separately, so that on one instrument any tune or composition of music within its range can be performed with an endless sheet or belt perforated to correspond with the notes and their succession and duration, and such piece or pieces can be repeated at pleasure with any desired interval of time, regulated by the motion of the crank.

What I claim as my invention, and desire to secure by Letters Patent, is—

1. In a mechanical musical instrument, the combination of air ducts or passages, an inclosing chest or case from which air enters them, means for causing air to pass through the said ducts or passages, a perforated strip or sheet serving as a valve, whereby air is admitted to and excluded from such air ducts or passages, all being organized so that the air in said chest or case serves, by its pressure, to hold the strip or sheet to its seat at the ends of the air ducts or passages, substantially as specified.

2. In a musical instrument, the combination of air ducts or passages exposed at their outer ends to the atmospheric air, an exhaust-bellows for inducing air through the same, and a perforated strip or sheet serving as a valve, whereby air is admitted to and excluded from such air ducts or passages, all being organized so that atmospheric air serves by its pressure to hold the strip or sheet to its seat at the ends of the air ducts or passages, substantially as specified.

3. In a mechanical musical instrument, the combination of a reed-chamber containing reeds, bellows arranged below said reed-chamber for operating said reeds, a music-sheet for controlling the operation of said reeds, a rest for said music-sheet, a feed-roller for imparting motion to said music-sheet, and provided beyond the range of the reeds with a crank, and a rod, link, or pitman connected to said cranks and serving to transmit motion to the bellows, substantially as specified.

4. In a mechanical musical instrument, the combination of a reed-chamber containing reeds, bellows arranged below said reed-chamber for operating said reeds, a music-sheet for controlling the operation of said reeds, a rest for said music-sheet, a feed-roller provided beyond the range of the reeds with a hand-crank for operating it, and also provided with a second crank beyond the range of said reeds, and a rod, link, or pitman connected to the last-mentioned crank for transmitting motion to said bellows, substantially as specified.

5. The combination, with the endless perforated sheet *a* and reed-chamber C, of the shaft *d'*, pulleys E E, and the pressure-rollers E' E', arranged to propel the sheet A, substantially as and for the purpose specified.

6. The combination, with the crank *d*, pulleys E E, and rolls E' E', of the crank *f*, one or more, arranged to operate the bellows, substantially as and for the purpose set forth.

7. In a mechanical musical instrument, the combination of a reed-chamber containing reeds and constructed with air ducts or passages leading to said reeds and open at their outer ends to the external atmosphere, a music-sheet for controlling the operation of said reeds, a rest for said music-sheet at the outer ends of said ducts, and a resonant cover arranged directly over said rest and capable of being adjusted to different positions independently of the top or cover of the case of the instrument, for regulating the force of the musical tones, substantially as specified.

8. In a mechanical musical instrument, the combination of a reed-chamber containing reeds, and constructed with air ducts or passages leading to said reeds and open at their outer ends to the external atmosphere, a music-sheet for controlling the operation of said reeds, a rest for said music-sheet at the outer ends of said ducts or passages, guides at the ends of said rests to prevent undesirable transverse movement of said music-sheet, and a resonant cover arranged directly over said rest and capable of being adjusted to different positions for regulating the force of the musical tones, substantially as specified.

9. The combination, with a mechanical musical instrument, of the resonant sounding board or cover $E^3$, made movable for the purpose of facilitating the insertion of the music-sheet, substantially as and for the purpose specified.

ELIAS P. NEEDHAM.

Witnesses:
OSCAR H. HEWLETT,
C. A. NEEDHAM.